(12) United States Patent
Sung

(10) Patent No.: US 7,405,925 B2
(45) Date of Patent: Jul. 29, 2008

(54) DISPLAY APPARATUS

(75) Inventor: Ki-Hyub Sung, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 525 days.

(21) Appl. No.: 09/904,665

(22) Filed: Jul. 16, 2001

(65) Prior Publication Data

US 2002/0080297 A1 Jun. 27, 2002

(30) Foreign Application Priority Data

Dec. 27, 2000 (KR) ............................. 2000-83365

(51) Int. Cl.
*H05K 5/00* (2006.01)
*G02F 1/1333* (2006.01)
(52) U.S. Cl. ..................... 361/681; 349/58; 349/65; 345/905
(58) Field of Classification Search ............. 361/681, 361/683
See application file for complete search history.

(56) References Cited

U.S. PATENT DOCUMENTS

| | | | | |
|---|---|---|---|---|
| 5,768,095 | A * | 6/1998 | Nakamura et al. | 361/681 |
| 6,426,803 | B1 * | 7/2002 | Sasai et al. | 358/400 |
| 6,587,166 | B1 * | 7/2003 | Lee et al. | 349/58 |

FOREIGN PATENT DOCUMENTS

| JP | 55-81979 | 6/1980 |
|---|---|---|
| JP | 57-104670 | 6/1982 |
| JP | 62-1475 | 1/1987 |
| JP | 62-1479 | 1/1987 |
| JP | 3001011 | 6/1994 |
| JP | 09-297542 | 11/1997 |
| JP | 10-41651 | 2/1998 |
| JP | 2000-249126 | 9/2000 |
| KR | 62-17284 | 2/1987 |
| KR | 1994-21151 | 9/1994 |
| KR | 1995-2521 | 1/1995 |
| KR | 1997-16885 | 4/1997 |
| KR | 1999-41573 | 12/1999 |

OTHER PUBLICATIONS

*Japanese Office Action* (dated Mar. 16, 2004).

* cited by examiner

*Primary Examiner*—Jayprakash N Gandhi
*Assistant Examiner*—Zachary M Pape
(74) *Attorney, Agent, or Firm*—Robert E. Bushnell, Esq.

(57) ABSTRACT

A display apparatus comprising an LCD panel, a panel support supporting the LCD panel, a front cover disposed in front of the LCD panel, and a rear cover disposed in the rear of the LCD panel and the panel support and coupled with the front cover, further comprising at least one coupling extended from one of a rear surface of the front cover and a front face of the rear cover toward the other thereof, having an groove formed on its plane; and at least one rib formed at the other thereof, being engaged with the groove of the coupling. With this configuration, there is provided a display apparatus capable of facilitating an assembling and disassembling of the front cover and the rear cover, decreasing the time to be consumed for the assembling and disassembling. In addition, the display apparatus has slim and compact in appearance.

14 Claims, 11 Drawing Sheets

DISPLAY APPARATUS

CLAIM OF PRIORITY

This application makes reference to, incorporates the same herein, and claims all benefits accruing under 35 U.S.C §119 from an application entitled Display earlier filed in the Korean Industrial Property Office on 27 Dec. 2000, and there duly assigned Ser. No. 2000-83365 by that Office.

BACKGROUND OF THE INVENTION

1. Field of the Invention

The present invention relates in general to display apparatuses, and more particularly, to a display apparatus having an improved coupling structure of a front cover and a rear cover between which a panel support supporting an LCD panel is housed.

2. Description of the Related Art

A display apparatus collectively refers to monitors for TV sets or computer systems, and includes a cathode ray tube (CRT) monitor and a liquid crystal display (LCD) monitor.

In a CRT monitor, if fluorescent materials of monochrome, or R (Red), G (Green) and B (Blue) colors coated on an inner surface of a panel of the CRT emit light with different brightnesses or colors by electron beams with different amounts depending upon video signals with different intensities. The CRT monitor is cost-efficient and has an excellent performance, and therefore, it has been popularized. However, the CRT monitor is bulky, thereby giving users inconvenience in use.

In the LCD monitor, if voltage is supplied, the arrangement of molecules in a liquid crystal is varied, preventing light from passing through. The LCD monitor enables production of a thin flat monitor. However, the LCD monitor is expensive in comparison with the CRT monitor and is inferior in resolution to the CRT monitor.

Herein below, a display apparatus comprising an LCD panel, being contemplated by the Assignee of the present invention, will be described with reference to FIGS. 10 and 11.

The display apparatus is, as shown in FIG. 10, comprised of a front cover 112 and a rear cover 127 coupled to each other to form a space therebetween, an LCD panel 140 having an active face on which a picture is displayed, a panel support 142 supporting the LCD panel 140, and a printed circuit board (PCB) assembly 144 supported by a PCB cover 146 so as to transmit an electric signal to the LCD panel 140.

The front cover 112 is comprised of a front frame 114 formed with a window 116 through which the active face of the LCD panel 140 is exposed to the outside, and a flange 117 bent from every side of the front frame 114 toward the rear cover 127.

On the rear face of the front cover 112 are provided a plurality of first bosses 118 formed with threads therein so as to be engaged with first screws 135 passing through first screw holes 133 formed in the rear cover 127. On the rear face of the front cover 112 are also formed a plurality of second bosses 120 formed with threads therein so as to be engaged with second screws 141 passing through second screw holes 145 formed in the side flanges 143 of the panel support 142, being spaced from the respective first bosses.

The process of assembling the display apparatus with this configuration will be described.

The LCD panel 140 is coupled to the panel support 142 so that the active face of the LCD panel 140 is directed toward the front cover 112. Then, the second screw holes 145 formed in the side flanges 143 of the panel support 142 are placed to communicate with the second bosses 120 formed in the rear face of the front cover 112, and the second screws 141 are inserted through the second screw holes 145 into the second bosses 120, thereby coupling the front cover 112 with the panel support 142 and the LCD panel 140.

Thereafter, the PCB assembly 144 is mounted to the rear face of the panel support 142 so that the PCB assembly 144 is electrically connected to the LCD panel 140. The PCB assembly 144 is then enclosed and supported by the PCB cover 146.

The rear cover 127 is then disposed so that the first screw holes 133 formed in the rear cover 127 are communicated with the first bosses 118 of the front cover 112, and the first screws 135 are inserted through the first screw holes 133 into the first bosses 118, thereby coupling the front cover 112 and the rear cover 127 to each other. Hence, the assembly of the display apparatus is completed.

In the display apparatus, however, because the front cover 112 and the panel support 142, and the front cover 112 and the rear cover 127 are srew-coupled, the assembly becomes complicated and time consuming.

Further, to couple the front cover 112 with the panel support 142, the separate side flanges 143 have to be prepared at the panel support 142, and accordingly the breadth (B) (refer to FIG. 11) of the front frame 114 of the front cover 112 is large, in order to accommodate the side flanges 143 (refer to FIG. 10). The large breadth B of the front frame 114 raises the cost of production of the front cover 112, and prevents a slim and compact design of the display apparatus. Furthermore, when a user stares at the display apparatus, an optical illusion may be caused because the active face of the LCD panel 140 seems smaller than its actual size relative to the enlarged front frame 114.

SUMMARY OF THE INVENTION

Accordingly, the present invention has been made keeping in mind the above-described shortcomings, and an object of the present invention is to provide a display apparatus capable of shortening the period of time for assembly and facilitating the assembly.

Another object of the present invention is to provide a display apparatus capable of achieving a thin and compact design, by reducing the breadth of a front frame of a front cover.

These and other objects of the present invention may be achieved by a provision of a display apparatus comprising an LCD panel, a panel support supporting the LCD panel, a front cover disposed in front of the LCD panel, and a rear cover disposed in the rear of the LCD panel and coupled with the front cover, further comprising at least one coupling extended from one of a rear face of the front cover and a front face of the rear cover toward the other thereof, having an engaging part formed on its plane; and at least one rib formed at the other thereof, being engaged with the engaging part of the coupling.

Preferably, the engaging part of the coupling is comprised of a groove.

The couplings are disposed at four corner portions of the front cover; and the ribs are disposed at four corner portions of the rear cover.

Effectively, a hole is formed on the plane of the rear cover, so that a tool for removing the engagement of the coupling and the rib passes through the hole.

The apparatus further comprises at least a pair of stops protruding from an inner face of one of the front cover and the rear cover, so as to contact the panel support, thereby preventing the panel support from moving across the plane of the LCD panel.

Preferably, the stops are disposed adjacent to the four corner portions of the rear face of the front cover.

Effectively, a hook is formed at the leading edge of each stop, being engaged with an edge of the panel support.

The apparatus further comprises a support rib protruding from the rear cover so as to contact each stop, thereby preventing the stop from becoming disengaged from the support panel. Preferably, the panel support is formed with a projection, allowing the hook of each stop to be engaged therewith.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
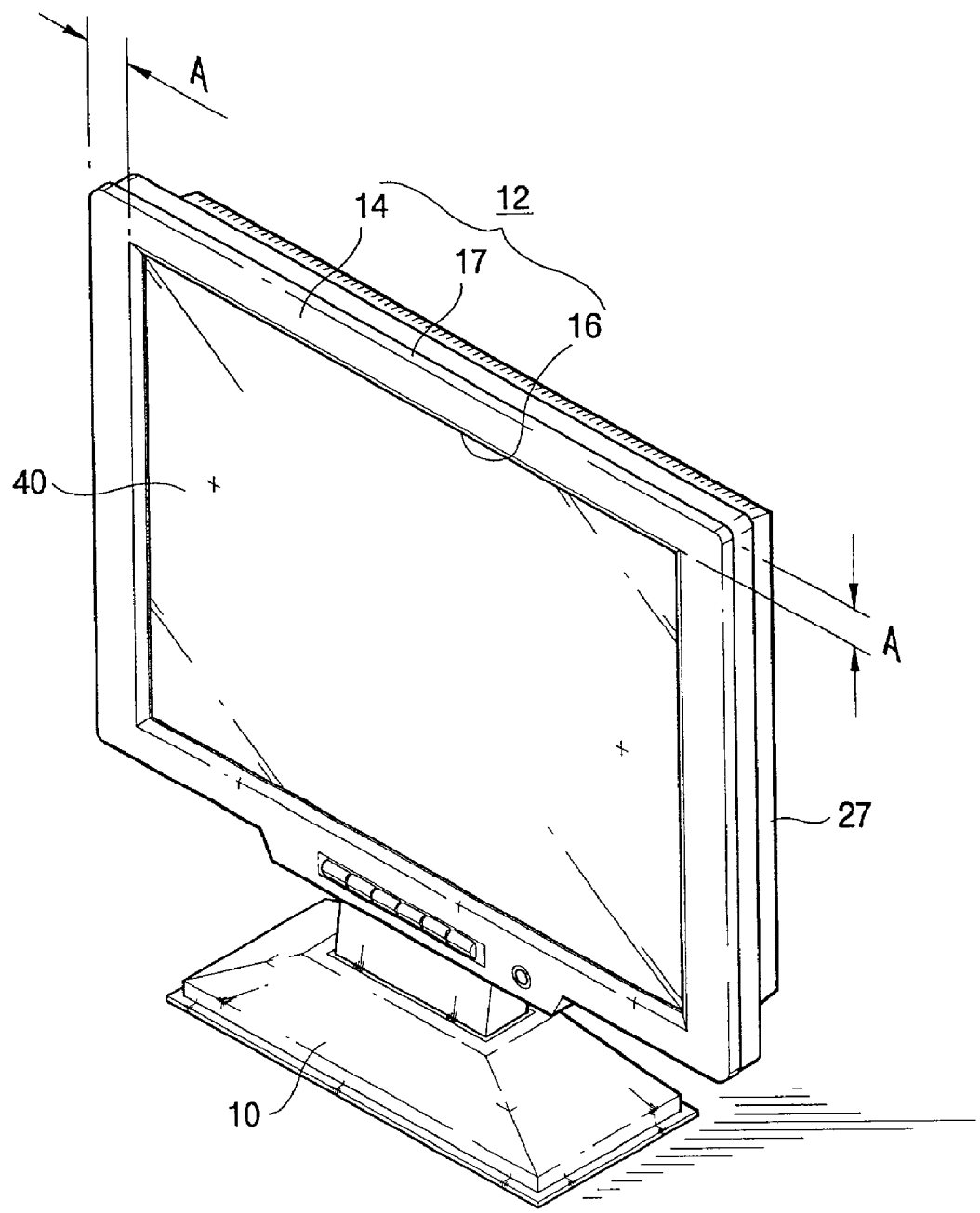
FIG. 1 is a perspective view of a display apparatus according to a first embodiment of the present invention.

Herein below, the present invention will be described in detail, with reference to the accompanying drawings. As for the same parts in different embodiments, the same reference numerals will be assigned thereto. For the sake of explanation, an assemblage of a front cover and a rear cover will be described with regard to FIGS. 2 through 6, and an assemblage of the front cover and a panel support will be described with regard to FIGS. 3 and 9.

A display apparatus used in a computer system or a TV set is usually installed on a desk, a table, etc. while being supported by a support stand 10, as shown in FIG. 1. The display apparatus is comprised of a bezel, referred to here as front cover 12, a rear cover 27 and an LCD panel 40. Front cover 12 is comprised of a front frame 14, a display window 16 and a skirt 17, wherein front frame 14 has a breadth A.

Figure 2:
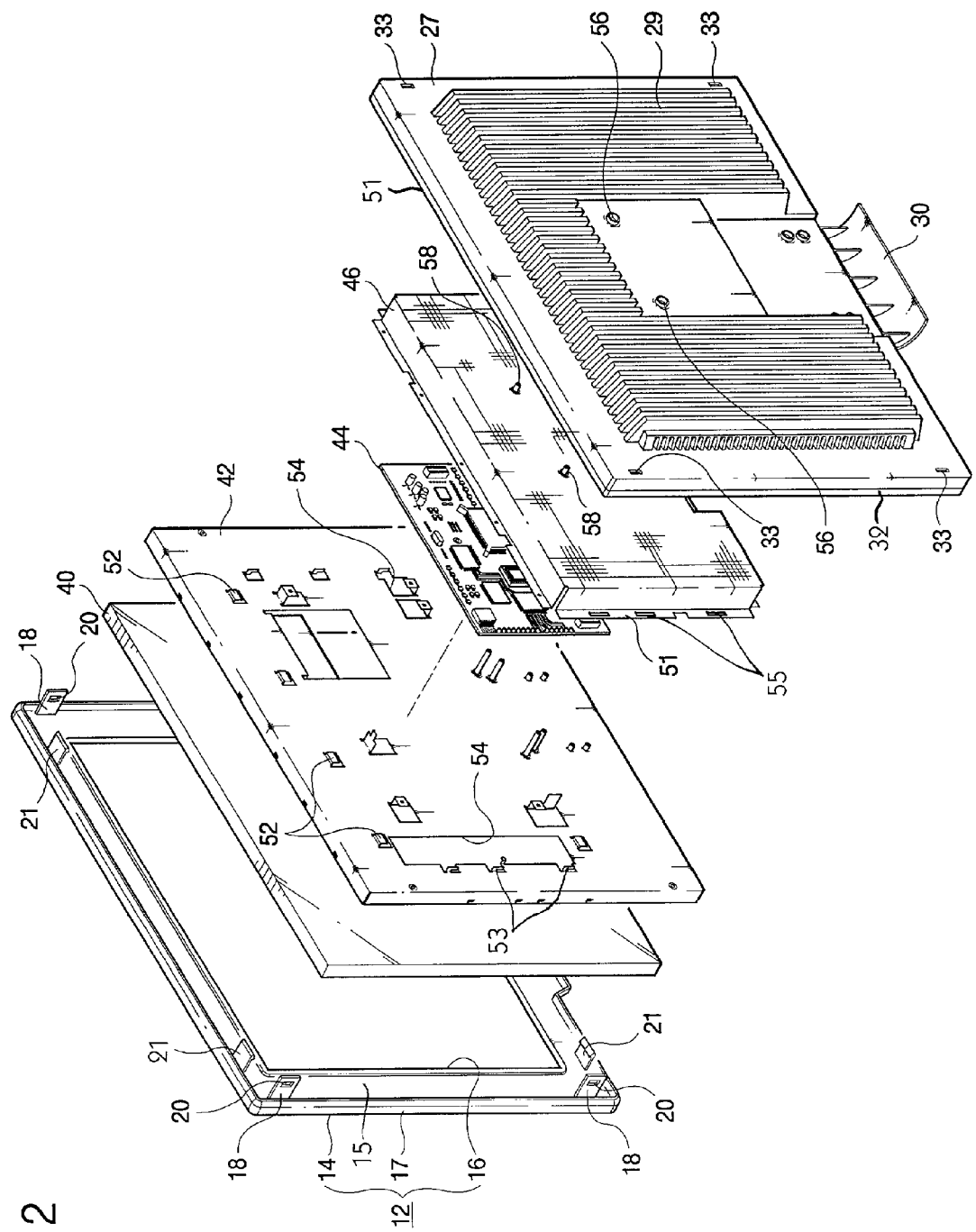
FIG. 2 is an exploded perspective view of FIG. 1.

As illustrated in FIG. 2, the display apparatus is comprised of front cover 12 and rear cover 27, which are coupled to each other so as to form a space therebetween, the LCD panel 40 is disposed within the space, having an active face on which a picture is displayed, a panel support 42 supporting the LCD panel 40, and a PCB assembly 44, supported by a PCB cover 46, so as to transmit electric signals to the LCD panel 40. Herein, the "active face" of the LCD panel 40 refers to a front face of the LCD panel 40 exposed through display window 16 of the front cover 12, on which the picture is displayed.

On the planar surface of the panel support 42 are formed a plurality of engagement pieces 52 which are engaged with an upper portion of a flange 51 formed along edges of the PCB cover 46, hooked tabs 53 formed to engage with slots 55 formed in side portions of flange 51, and a plurality of apertures 54 through which the LCD panel 40 is to be electrically connected to the PCB assembly 44. The PCB cover 46 has a plurality of bosses 58 on its rear surface, which are externally exposed through passages 56 of the rear cover 27.

The front cover 12 includes a front frame 14 formed with a display window 16 through which the active face of the LCD panel 40 is exposed to the outside, and a skirt 17 bent from every side of the front frame 14 to encircle a back surface 15 of front frame 14 and extending toward the rear cover 27.

The rear cover 27 is formed with a plurality of air slots 29 formed in the rear surface thereof, drawing in air so as to cool the PCB assembly 44, and a terminal housing 30 through which a variety of connection wires, etc. pass.

Figure 3:
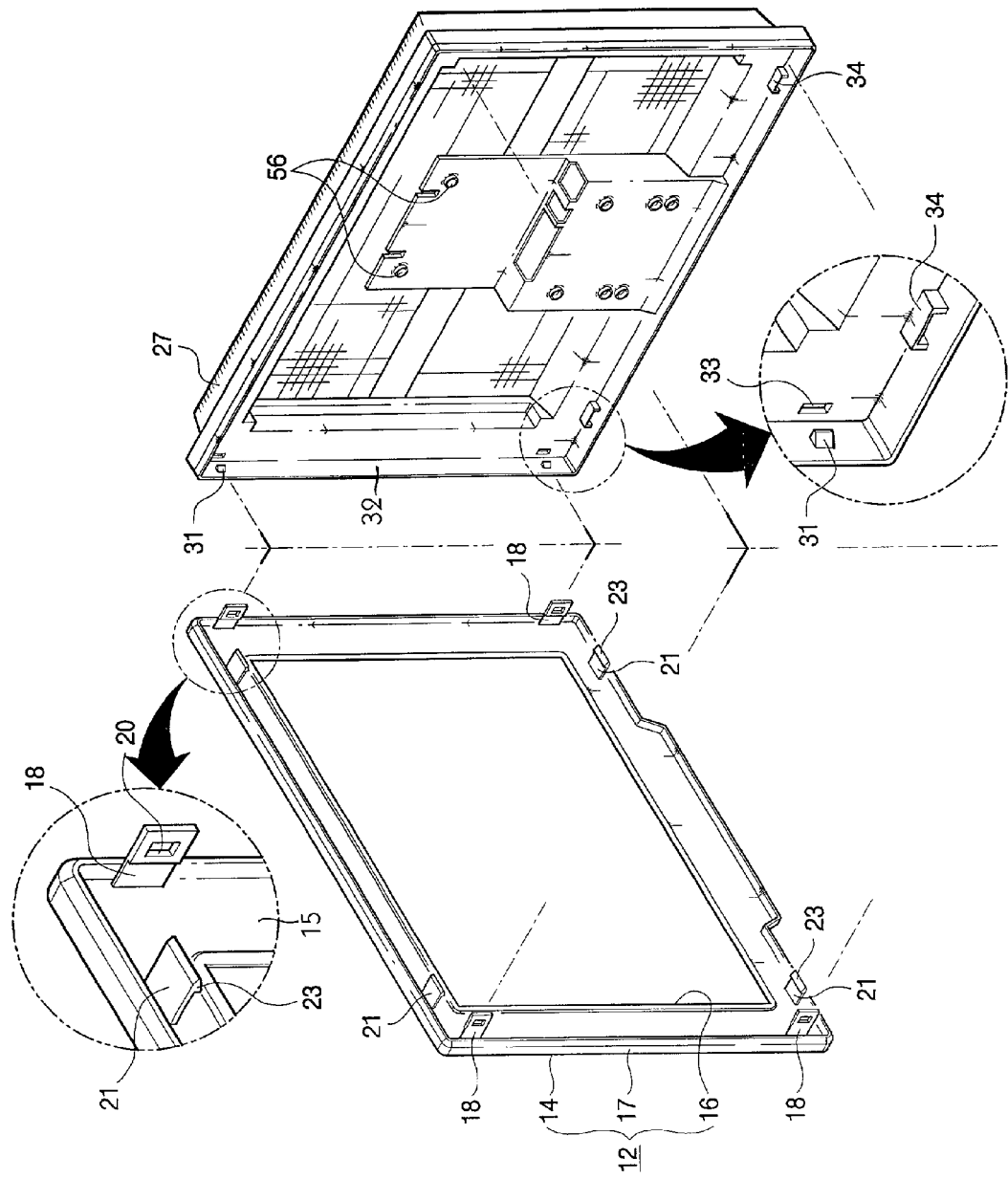
FIG. 3 is an enlarged exploded perspective view of a front cover and a rear cover according to a first embodiment of the present invention.

Referring to FIG. 3, the surface 15 has a plurality of couplings 18 extended from its plane toward the rear cover 27. The couplings 18 are disposed in proximity to the four corners of the front cover 12. On the plane of each coupling 18 is formed an engaging part, preferably a groove 20 into which a rib 31 of the rear cover 27 is inserted.

Advantageously, the coupling 18 is formed inside the skirt 17 so as to contact the rear of the front frame 14, thereby reducing a breadth A of the front frame 14. In the case that the front cover 12 is manufactured by molding, the coupling 18 is integrally formed inside the skirt 17, to enhance the strength and stiffness thereof. Since the coupling 18 is formed inside the skirt 17, the breadth A of the front frame 14 can be minimized, and therefore, the size of the front frame relative to the LCD panel is reduced.

The front frame 14 of the front cover 12 also includes a plurality of stops 21 on its rear face adjacent to the respective couplings 18. Advantageously, each stop 21 is formed from the rear surface 15 of the front frame 14 along the inner surface of the skirt 17, like the coupling 18, so as to reduce the breadth A of the front frame 14. Accordingly, where the front cover 12 is manufactured by molding as described above, the stops 21 in addition to the couplings 18 are integrally formed (see FIGS. 4, 6, 8 and 9) at predetermined distances from the inside surface of the skirt 17, preferably to maintain the coupling strength and stiffness.

The rear cover 27 has a skirt 32, and the ribs 31 are disposed on skirt 32 to be engaged with the grooves 20 of the couplings 18 formed at the front cover 12. The ribs 31 are disposed in proximity to the four corners of the rear cover 27 so as to correspond to the positions where the couplings 18 of the front cover 12 are formed. As illustrated in FIG. 3, each rib 31 takes the shape of hook whose one side is slanted so as to allow it to be easily engaged with the groove 20 of the coupling 18. The front cover 12 and the rear cover 27 assembled to each other by the couplings 18 and the ribs 31 are, as shown in FIG. 4, shaped so as not to be easily disengaged each other.

The rear cover 27 is formed with a plurality of support ribs 34 at the positions corresponding to the stops 21, so as to prevent the stop 21 from being disengaged from the panel support 42 by contacting the stop 21. The support rib 34 presses the hook 23 of the stop 21 toward the panel support 42, thereby preventing the stop 21 from being disengaged from the panel support 42. A tool access hole 33 is formed in the proximity of rib 31 of rear cover 27 for enabling a user to release the engagement of the coupling 18 and the rib 31. Alternatively (not shown), tool access hole 33 could be formed in skirt 32 between rib 31 and surface 28 of rear cover 27.

Figure 4:
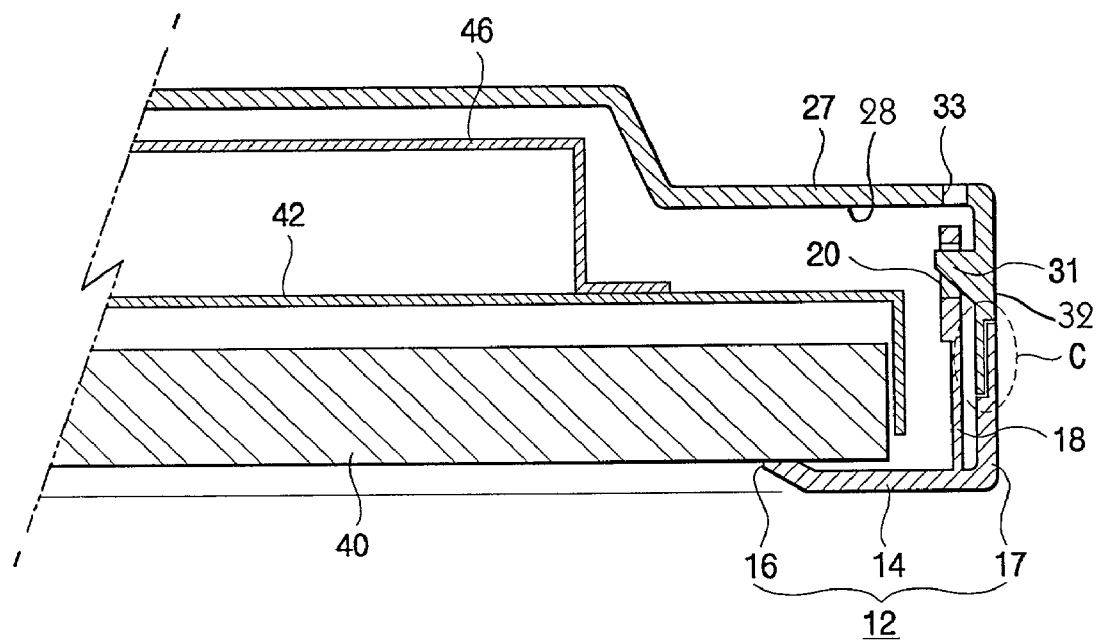
FIG. 4 is an enlarged sectional view of a main portion of FIG. 1.

As shown in FIG. 4, the skirt 17 of front cover 12 and a skirt 32 of rear cover 27 have rabbetted edges, as shown at "C", such that the rabbets overlap when the front cover 12 and rear cover 27 are assembled together.

Figure 5:
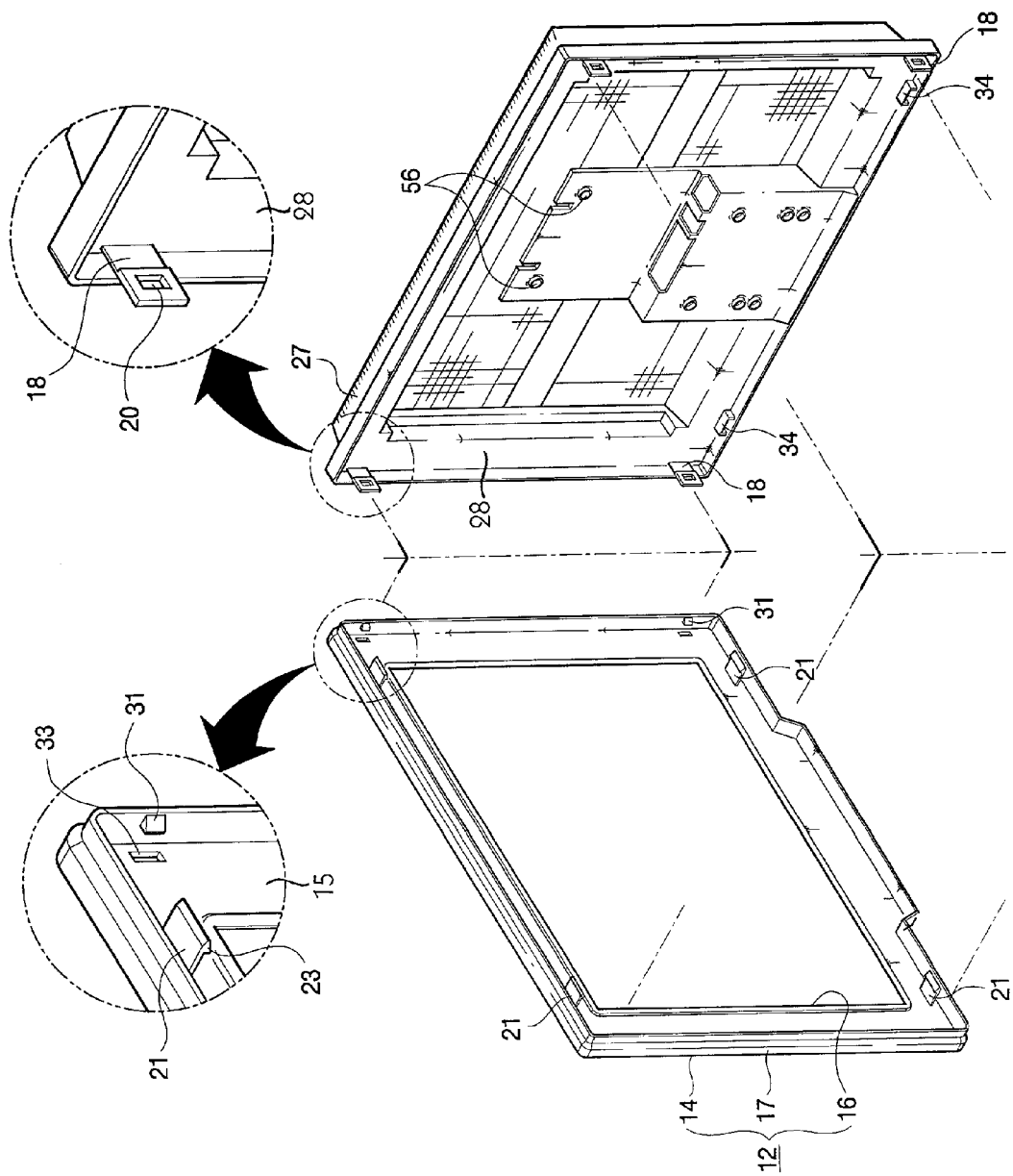
FIG. 5 is an enlarged exploded perspective view of a front cover and a rear cover according to a second embodiment of the present invention.
Figure 6:
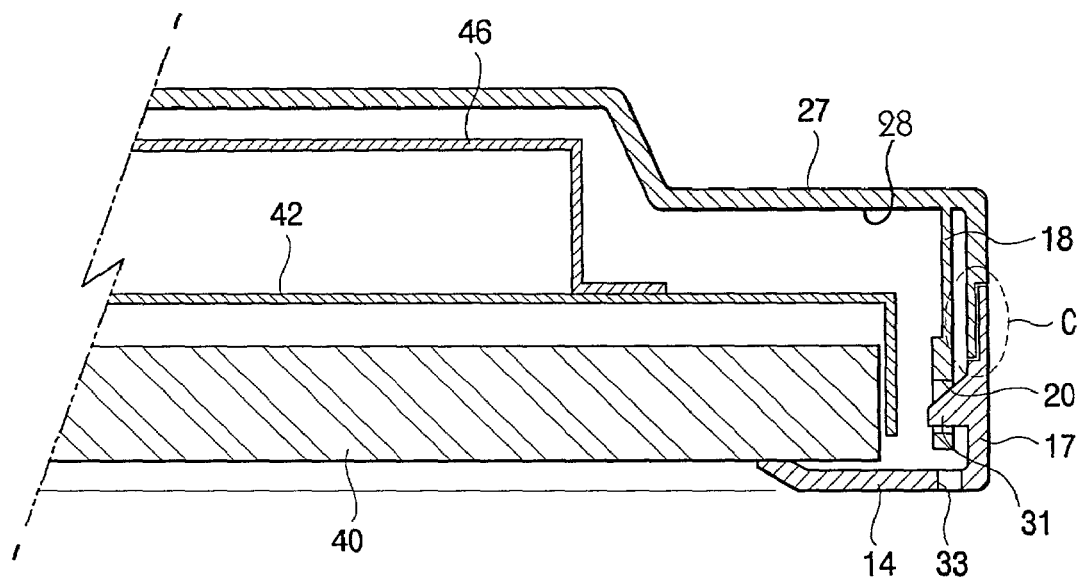
FIG. 6 is an enlarged sectional view of a portion of FIG. 5.

FIGS. 5 and 6 show an alternative arrangement of several of the elements discussed above with respect to FIGS. 2-4. As shown in FIGS. 5 and 6, the coupling 18 and the rib 31 may be reversed, contrary to the previous embodiment. That is, the coupling 18 may be formed to extend from an inner surface 28 of rear cover 27, and the rib 31 to be engaged with the coupling 18 may be formed on skirt 17 of the front cover 12. Although the coupling 18 and the rib 31 are positioned as shown in FIGS. 5 and 6, there would be no problem in embodying the technical idea of the present invention. However, if the rib 31 is formed in the front cover 12 as depicted in FIGS. 5 and 6, the tool access holes 33 have to be formed in the front cover 12, however, if the tool access holes 33 are formed through front frame 14, the aesthetic design of the front cover 27 would be compromised. Alternatively (not shown), tool access hole 33 could be formed in skirt 17 between rib 31 and rear surface 15 of front cover 12, however, it is preferable that the coupling 18 is formed on the front cover 12 and the rib 31 is formed on the rear cover 27, as shown in FIGS. 2 through 4.

Figure 7:
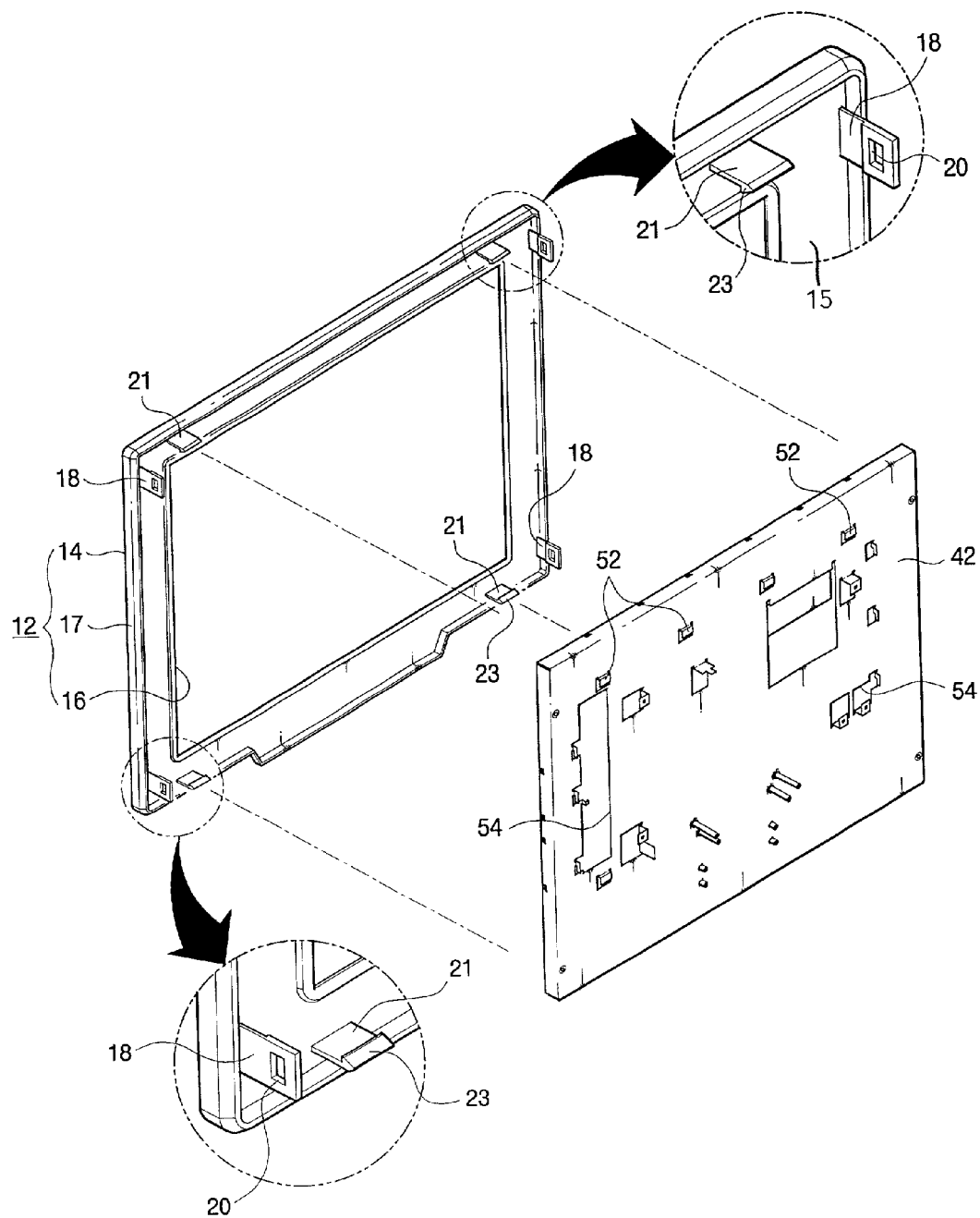
FIG. 7 is an enlarged exploded perspective view of the front cover and a panel support according to a first embodiment of the present invention.
Figure 8:
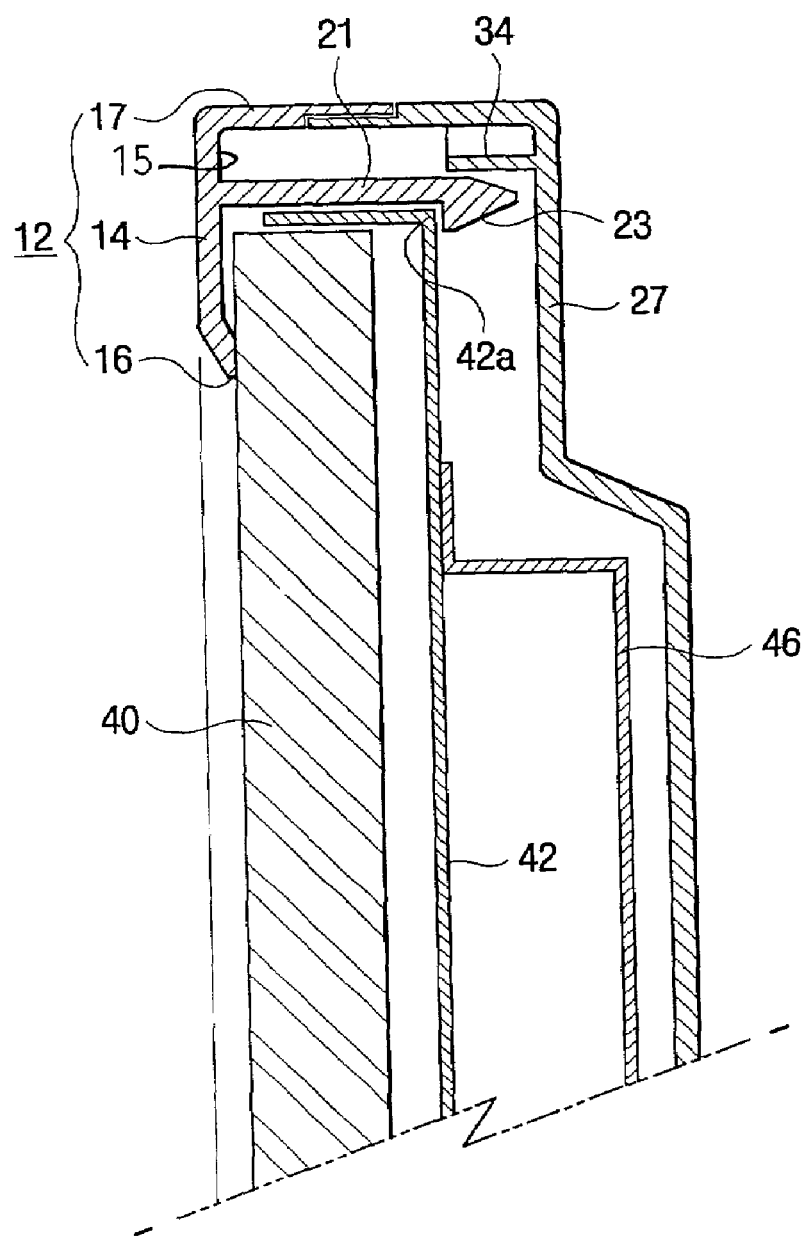
FIG. 8 is an enlarged sectional view of another portion of FIG. 1.

Referring to FIGS. 7 and 8, the front frame 14 of the front cover 12 includes a plurality of stops 21 on its rear face adjacent to the respective couplings 18. Advantageously, each stop 21 is formed from the rear surface 15 of the front frame 14 along the inner surface of the skirt 17, like the coupling 18, so as to reduce the breadth A of the front frame 14.

The stops 21 contact the panel support 42, as shown in FIG. 8, so as to prevent the panel support 42 from moving across the plane of the LCD panel 40. To this end, a leading edge of each stop 21 is formed with a hook 23 engaged with a rear corner portion 42a of the panel support 42.

The rear cover 27 is formed with a plurality of support ribs 34 (see FIG. 3) at the positions corresponding to the stops 21, so as to prevent the stop 21 from being disengaged from the panel support 42 by contacting the stop 21. The support rib 34 presses the hook 23 of the stop 21 toward the panel support 42, thereby preventing the stop 21 from being disengaged from the panel support 42.

Figure 9:
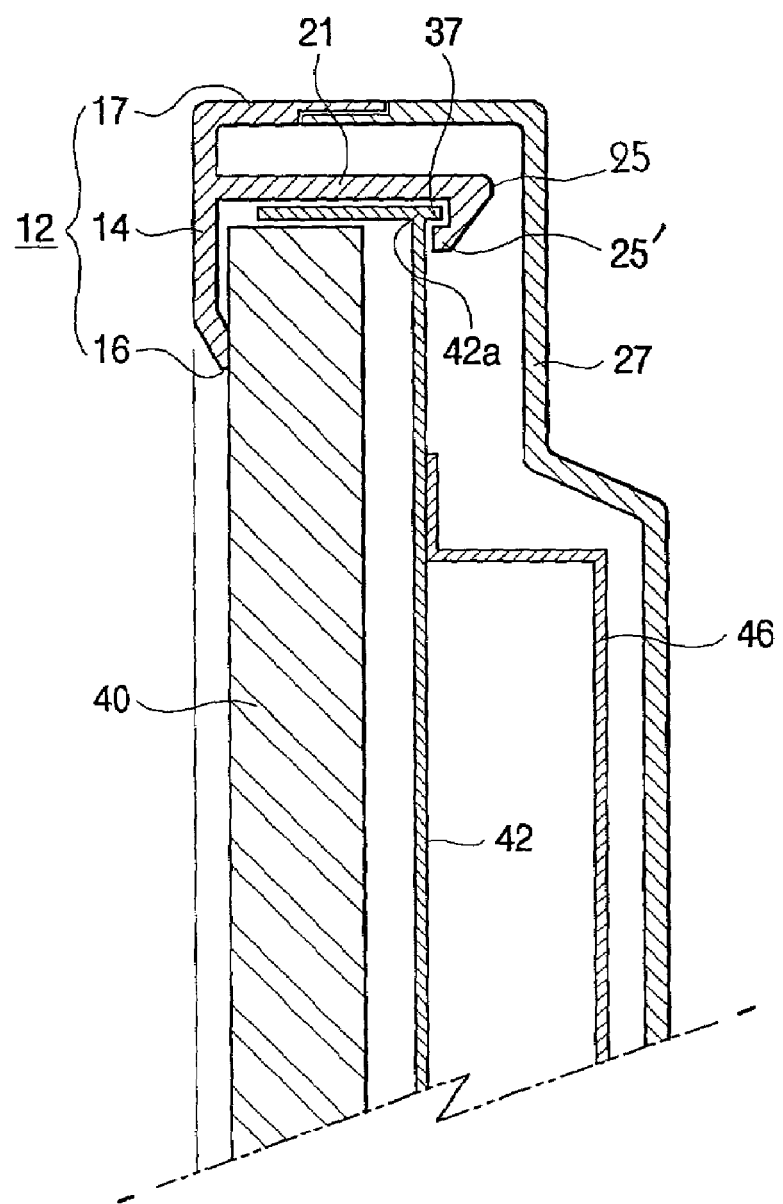
FIG. 9 is an enlarged sectional view partially showing an assembly of a front cover and a panel support according to a third embodiment of the present invention.
Figure 10:
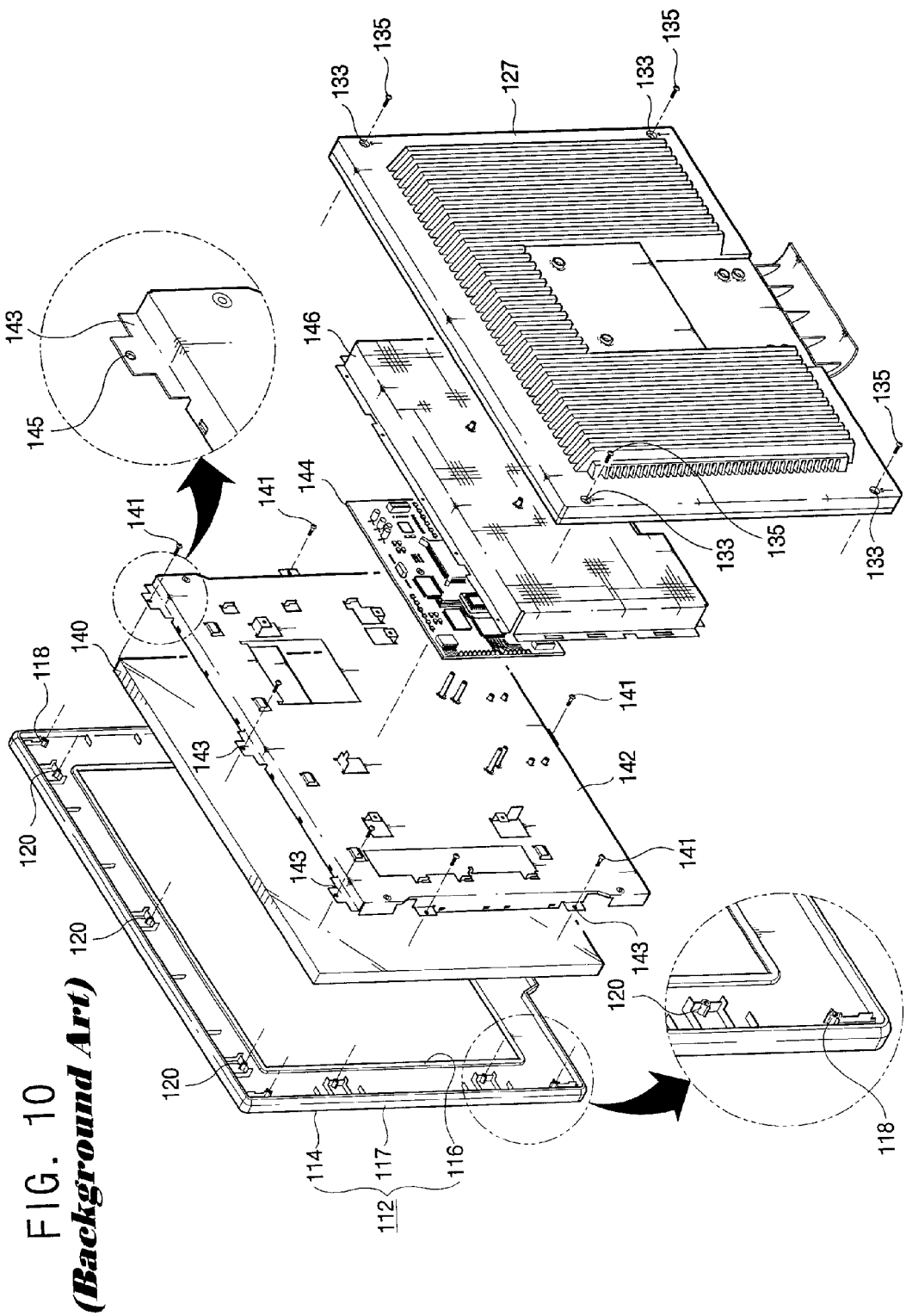
FIG. 10 is an exploded perspective view of another display apparatus.
Figure 11:
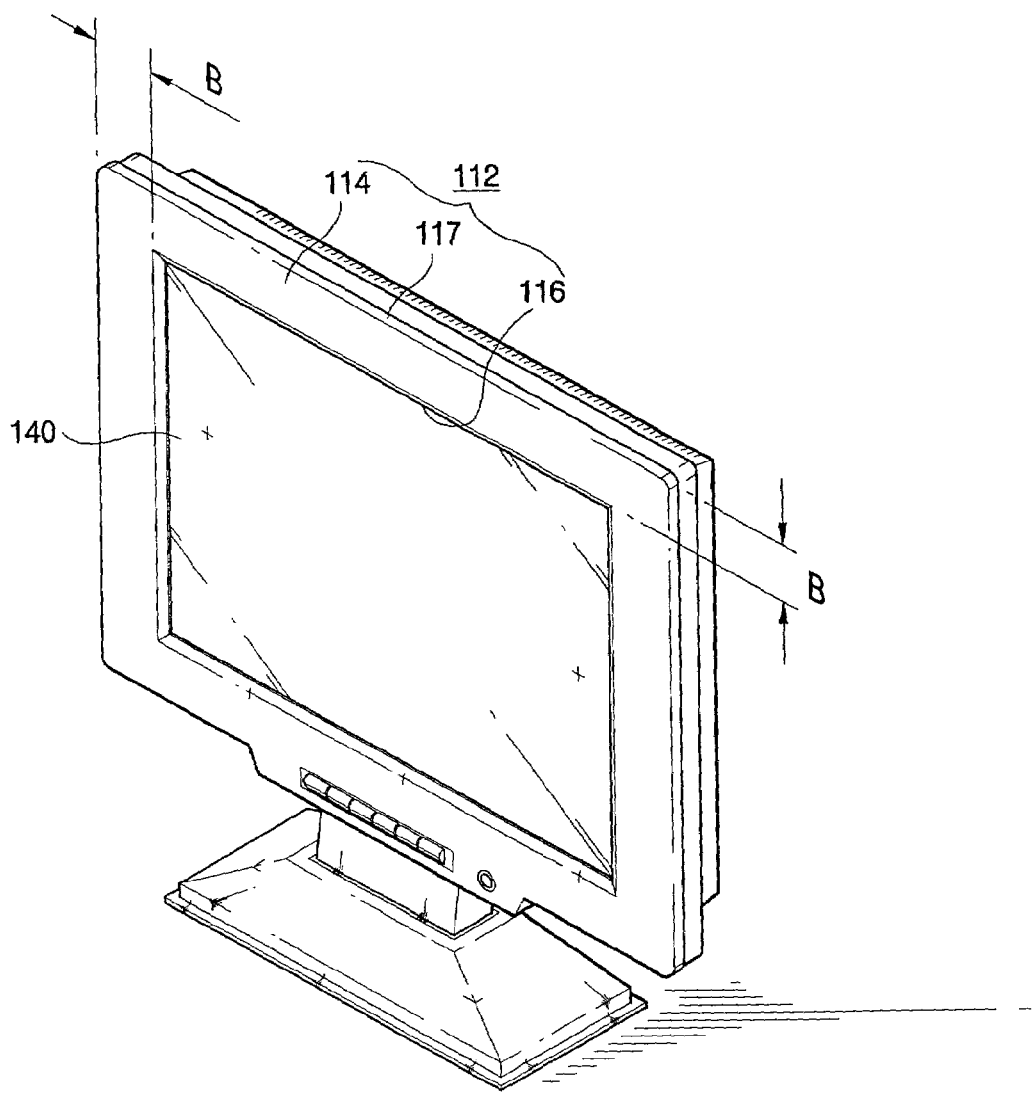
FIG. 11 is a perspective view showing the display apparatus of FIG. 10.

Alternatively, as shown in FIG. 9, a leading edge of a hook 25 may be inwardly bent, forming a bent part 25', and a stopper 37 may be formed in a rear corner of the panel support 42 so as to prevent the bent part 25' from being disengaged, instead of using the separate support rib 34 of FIG. 8.

With respect to the preferred configuration of FIGS. 2-4, 7 and 8, a process of assembling a display apparatus according to the present invention will be described.

First, the LCD panel 40 is coupled to the panel support 42 so as to allow the active face of the LCD panel 40 to be directed toward the display window 16 of front cover 12, and the panel support 42 is pressed toward the front frame 14 of the front cover 12 so that the rear corner portion 42a of the panel support 42 is engaged with the hook 23 of each stop 21 formed in the rear of the front frame 14.

After the panel support 42 is coupled to front cover 12, the PCB assembly 44 is mounted to the rear of the panel support 42 so that the PCB assembly 44 is electrically connected to the LCD panel 40. Then, the LCD panel 40 is covered with the PCB cover 46.

The rear cover 27 is disposed so as to allow its sides to correspond to those of the front cover 12, and then pressed toward the front cover 12. When the rear cover 27 is pressed toward the front cover 12, each rib 31 formed in the rear cover 27 is engaged with its corresponding groove 20 of the coupling 18 formed in the front cover 12, thereby making the front cover 12 and the rear cover 27 to be coupled to each other. At this time, each support rib 34 formed in the rear cover 27 is contacted with the stop 21 formed in the front cover 12, to press the stop 21 toward the support panel 42, thereby preventing the hook 23 of the stop 21 from being disengaged from the support panel 42. Hence, the display apparatus is assembled in a simplified manner according to the present invention.

Where there is a need to disassemble the assembled display apparatus for, e.g., maintenance, a tool is inserted through each tool access hole 33 formed in the rear cover 27, so as to disengage each rib 31 from each groove 20 of the coupling 18, thereby disassembling the rear cover 27 from the front cover 12. Then, the hooks 23 are manually disengaged from the rear corners 42a of the panel support 42, thereby disconnecting the panel support 42 and the LCD panel 40 from the front cover 12. Following this process, the display apparatus can be easily disassembled according to the present invention.

As described above, according to the present invention, there are provided at least one coupling 18 formed inside the skirt 17 of the front cover 12, having the groove 20, and at least one rib 31 formed inside the skirt 32 of the rear cover 27, being engaged with the groove 20, thereby facilitating an assemblage of the front cover 12 and the rear cover 27, decreasing time for the assemblage, and reducing the breadth A of the front frame 14.

In addition, according to the present invention, there are provided the plurality of stops 21 extended from back surface 15 of front frame 14 of front cover 12, having the hook 23, holding the corner portions 42a of the panel support 42, thereby preventing the panel support 42 from moving across the LCD panel 40. As a result, the display apparatus according to the present invention becomes slim and compact in appearance, thereby decreasing the cost of material used for molding of the front and rear covers, and thereby facilitating installation and maintenance of the display apparatus. Especially, since the area or breadth of the front frame is reduced, when a user looks at the display apparatus, the optical illusion, the phenomenon which an active face of the LCD panel 40 is seen relatively smaller, may be eliminated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus, comprising:
   a panel bearing a screen disposed to display varying visual images;
   a panel support holding the panel;
   a bezel framing a front periphery of the panel;
   a rear cover removably mating with said bezel while encasing said panel held by said panel support;
   at least one rib formed to project from a peripheral surface of a first one of the bezel and the rear cover;
   at least one deformable coupling bearing a groove, extending from an inner surface of a different one of the bezel and the rear cover, oriented to embrace a correspond rib during said mating, wherein the rib is inserted in the groove; and at least four stops disposed to be adjacent to four corner portions of a rear surface of the bezel, and protrude from said rear surface of the bezel to engage the panel support and prevent the panel support from moving across a plane of the panel, wherein a hook is formed at a leading edge of each stop for engaging an edge of the panel support, and the edge of the panel support is formed with a projection allowing the hook of each stop to overlap the projection to support the engagement of the hook and the edge of the panel support.

2. The display apparatus according to claim 1, further comprising at least one tool access hole formed through the rear cover for permitting a tool to be inserted through the rear cover to disengage the coupling and the rib.

3. The display apparatus according to claim 1, further comprising at least a pair of stops protruding from a rear surface of the bezel to engage the panel support and prevent the panel support from moving across a plane of the panel.

4. The display apparatus according to claim 1, further comprising a plurality of support ribs protruding from the rear cover so as to be contacted with each stop to force the hook of each stop toward the edge of the panel support to support the engagement of the hook and the edge of the panel support.

5. The display apparatus according to claim 1, further comprising a skirt of the bezel having a rabbetted edge and a skirt of the rear cover having a rabbetted edge that overlap when said bezel and said rear cover are coupled together.

6. The display apparatus of claim 1, comprised of:
one said rib disposed at each corner portion of the rear cover; and
a corresponding said coupling disposed at each corner portion of the bezel.

7. The display apparatus of claim 1, comprised of:
one said coupling disposed at each corner portion of the rear cover; and
a corresponding said rib disposed at each corner portion of the bezel.

8. The display apparatus of claim 1, comprised of:
at least one stop extending from an inner surface of said bezel engaging said support while maintaining said bezel surrounding said screen.

9. A display apparatus, comprising:
a panel bearing a screen disposed to display varying visual images;
a bezel framing a front periphery of the panel;
a rear cover removably mating with said bezel while encasing said panel;
at least one rib formed to project from a peripheral surface of a first one of the bezel and the rear cover;
at least one deformable coupling bearing a groove, extending from an inner surface of a different one of the bezel and the rear cover, oriented to embrace a corresponding rib during said mating, wherein the rib is inserted in the groove, with one said coupling disposed at each corner portion of the first one of the bezel and rear cover; and a corresponding said rib disposed at each corner portion of the different one of the bezel and the rear cover;
at least four stops disposed to be adjacent to four corner portions of a rear surface of the bezel, and protrude from said inner surface of the bezel to engage the panel and prevent the panel from moving, wherein a hook is formed at a leading edge of each stop for engaging an edge of the panel, and
a plurality of support ribs protruding from the rear cover so as to contact each stop to force the hook of each stop toward the edge of the panel to support the engagement of the hook and the edge of the panel.

10. The display apparatus according to claim 9, wherein the edge of the panel is formed with a projection allowing the hook of each stop to overlap the projection to support the engagement of the hook and the edge of the panel.

11. The display apparatus of claim 9, comprised of:
one said coupling disposed at each corner portion of the rear cover; and
a corresponding said rib disposed at each corner portion of the bezel.

12. The display apparatus according to claim 11, further comprising at least a pair of stops protruding from an inner surface of the bezel to engage the panel, to prevent the panel from moving.

13. The display apparatus according to claim 11, further comprising a skirt of the rear cover having a rabbetted edge and a skirt of said bezel having a rabbetted edge that overlap when said bezel and said rear cover are coupled together.

14. The display apparatus of claim 9, comprised of:
one said rib disposed at each corner portion of the rear cover; and
a corresponding said coupling disposed at each corner portion of the bezel.

* * * * *